United States Patent
Xu et al.

(10) Patent No.: US 11,777,408 B2
(45) Date of Patent: Oct. 3, 2023

(54) CONVERTER ADAPTABLE TO WIDE RANGE OUTPUT VOLTAGE AND CONTROL METHOD THEREOF

(71) Applicant: Delta Electronics (Shanghai) Co.,Ltd., Shanghai (CN)

(72) Inventors: Hairui Xu, Shanghai (CN); Haibin Song, Shanghai (CN); Daofei Xu, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 8 days.

(21) Appl. No.: 17/659,655

(22) Filed: Apr. 18, 2022

(65) Prior Publication Data

US 2022/0385190 A1  Dec. 1, 2022

(30) Foreign Application Priority Data

May 19, 2021 (CN) .......................... 202110547953.X

(51) Int. Cl.
*H02M 3/158* (2006.01)
*G05F 1/24* (2006.01)

(52) U.S. Cl.
CPC ............ *H02M 3/1582* (2013.01); *G05F 1/24* (2013.01)

(58) Field of Classification Search
CPC ........... H02M 3/1582; H02M 3/33592; H02M 1/0009; H02M 1/0035; H02M 1/0058; G05F 1/24
See application file for complete search history.

(56) References Cited

U.S. PATENT DOCUMENTS

| | | | |
|---|---|---|---|
| 2005/0041439 A1 | 2/2005 | Jang et al. | |
| 2016/0181927 A1* | 6/2016 | Chang | H02M 1/42 363/21.02 |
| 2018/0151582 A1 | 5/2018 | Wu et al. | |
| 2022/0385199 A1* | 12/2022 | Xu | H02M 3/33571 |
| 2022/0406515 A1* | 12/2022 | Yang | H01F 27/263 |

FOREIGN PATENT DOCUMENTS

| | | |
|---|---|---|
| CN | 103595253 A | 2/2014 |
| CN | 108155799 A | 6/2018 |
| CN | 108206631 A | 6/2018 |
| CN | 109768708 A | 5/2019 |
| TW | 201702785 A | 1/2017 |
| TW | 201717531 A | 5/2017 |
| WO | WO-2017049179 A1 * | 3/2017 ........ H02M 3/33507 |

* cited by examiner

*Primary Examiner* — Adolf D Berhane
(74) *Attorney, Agent, or Firm* — CKC & Partners Co., LLC

(57) ABSTRACT

The invention discloses a converter adaptable to a wide range output voltage and a control method thereof. The converter comprises a PWM half-bridge circuit. The control method comprises the steps of: controlling the PWM half-bridge circuit to enter into a discontinuous conduction mode by regulating a switching frequency; when the PWM half-bridge circuit is operated in the discontinuous conduction mode, oscillation occurs among the output inductor, a magnetizing inductor of the transformer and a parasitic capacitor of the PWM half-bridge circuit, and when a center point voltage of the primary switching bridge arm reaches a valley or a peak, turning on the corresponding power switch. The invention reduces switching loss by controlling the corresponding power switch in the PWM half-bridge circuit to turn on when a voltage across the power switch is oscillated to valley.

27 Claims, 6 Drawing Sheets

CONVERTER ADAPTABLE TO WIDE RANGE OUTPUT VOLTAGE AND CONTROL METHOD THEREOF

CROSS-REFERENCE TO RELATED APPLICATIONS

This non-provisional application claims priority under 35 U.S.C. § 119(a) on Patent Application No. 202110547953.X filed in P.R. China on May 19, 2021, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The invention relates to the field of power electronic converter, and particularly to a converter adaptable to a wide range output voltage and a control method thereof.

BACKGROUND

Recently, USB PD type C techniques are developed rapidly with a higher percentage of market occupancy and a wider application range, such as 5V for charging with the mobile phones, 12V for charging with the routers, 20V for charging with the laptops. To facilitate the various electronics products of consumers, the skilled in the art is devoted to roll out a new adapter, which has the wide-range output voltage and meet with the one-to-many application requirements.

In the conventional power adapter, the rated power of the mainstream is 65 W, and the typical topology of the mainstream usually use a flyback converter. The flyback converter possesses a strong capability for regulating the output voltage, and ensures an output efficiency at a light load to satisfy the standard requirement. However, as a regulation range of the output voltage becomes wider, the power will increase to 200 W or more. Due to energy storage characteristic of inductor, the flyback converter is not suitable to a large power, small size and high power density design.

On the other hand, when the power exceeds 75 W, a PFC circuit stage is introduced to satisfy the harmonic requirement. As for the DC-DC conversion stage, its input voltage has a relatively narrow range, such as home DC micro-grid, on board charging and etc. To address the above shortcomings, the conventional solutions have made many attempts, for example, a two-stage architecture including LLC stage and Buck stage, to satisfy the demand for a large power and wide range output. Though LLC stage can realize a high efficiency and help to the miniaturization design of the adapter, the two-stage architecture still has a poor conversion efficiency at a low output voltage because the operation of the LLC stage as well as the operation of the Buck stage. Finally, the two-stage architecture is very complex and expensive.

SUMMARY

To realize the above object, the invention provides a method for controlling a converter suitable for delivering a wide range output voltage to a load, comprising:

providing a converter, wherein the converter comprises a PWM half-bridge circuit, and the PWM half-bridge circuit comprises: a primary circuit comprising a primary switching bridge arm formed by a first power switch and a second power switch connected in series; a transformer comprising a primary coil coupled to the primary circuit, and a secondary coil; a secondary rectifier circuit comprising at least two synchronous rectifiers, and each of the at least two synchronous rectifiers having an input end coupled to the secondary coil; and an output filter circuit comprising an output inductor and an output capacitor, and coupled between an output end of the secondary rectifier circuit and the load;

controlling the PWM half-bridge circuit to enter into a discontinuous conduction mode by regulating a switching frequency; when the PWM half-bridge circuit operates in the discontinuous conduction mode, oscillation occurs among the output inductor, a magnetizing inductor of the transformer and a parasitic capacitor of the PWM half-bridge circuit, and when a midpoint voltage of the primary switching bridge arm reaches a valley or a peak, turning on the corresponding first power switch or second power switch.

The invention further provides a converter suitable for delivering a wide range output voltage to a load, comprising:

a PWM half-bridge circuit, wherein the PWM half-bridge circuit comprises a primary circuit comprising a primary switching bridge arm formed by a first power switch and a second power switch connected in series; a transformer comprising a primary coil coupled to the primary circuit, and a secondary coil; a secondary rectifier circuit comprising at least two synchronous rectifiers, and each of the at least two synchronous rectifiers having an input end coupled to the secondary coil; and an output filter circuit comprising an output inductor and an output capacitor, and coupled between an output end of the secondary rectifier circuit and the load; and a control unit, wherein the control unit configured to control the PWM half-bridge circuit to enter into a discontinuous conduction mode by regulating a switching frequency, when the PWM half-bridge circuit operates in the discontinuous conduction mode, oscillation occurs among the output inductor, a magnetizing inductor of the transformer and a parasitic capacitor of the PWM half-bridge circuit, and when a midpoint voltage of the primary switching bridge arm reaches a valley or a peak, turn on the corresponding first power switch or second power switch.

BRIEF DESCRIPTION OF THE DRAWINGS

To make the above and other objects, features, advantages and examples of the invention more apparent, the accompanying drawings are explained as follows.

DETAILED DESCRIPTION

Figure 1:
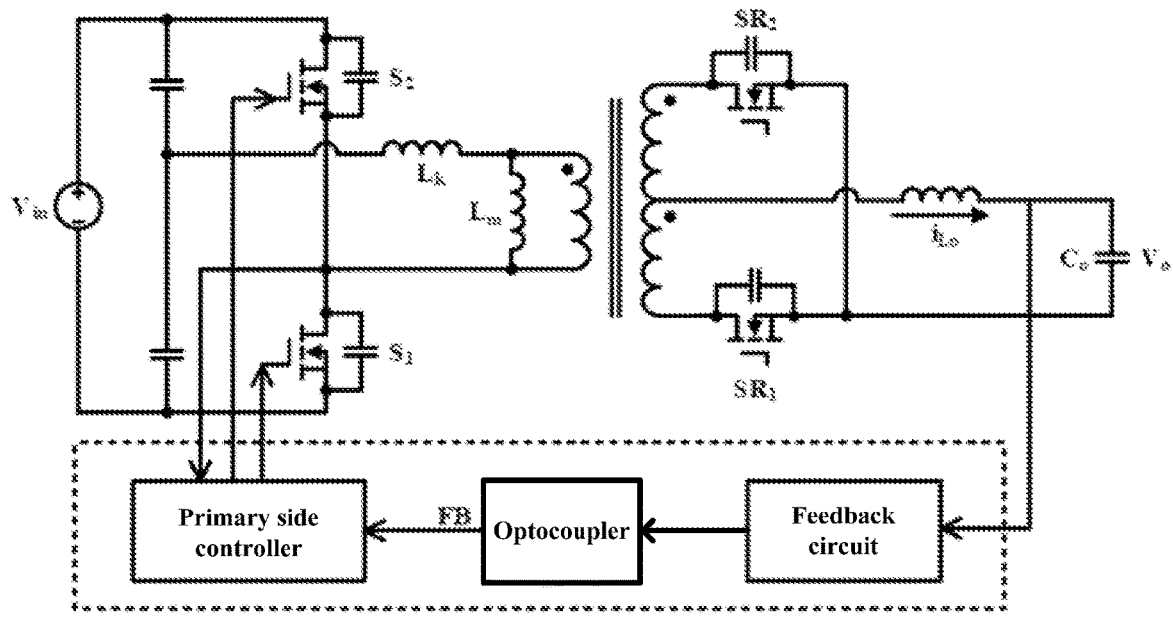
FIG. 1 is a circuit diagram of a conventional PWM half-bridge circuit.

To make descriptions of the invention clearer and complete, the accompanying drawings and various embodiments can be referred, and the same signs in the drawings represent the same or similar components. On the other hand, known components and steps are not described in the embodiments to avoid unnecessary limit to the invention. In addition, to simplify the drawings, some known common structures and elements are illustrated in the drawings in a simple manner.

The application provides a converter suitable for delivering a wide range output voltage to a load and a control method thereof, which uses a topological architecture of the PWM half-bridge circuit. On one hand, voltage switching function can be realized by the wide range voltage regulating capability of the PWM half-bridge circuit, and on the other hand, efficiency of the converter at a low voltage output and a light load can be improved by controlling the PWM half-bridge circuit to enter into in a discontinuous conduction mode at a low voltage output.

Figure 2:
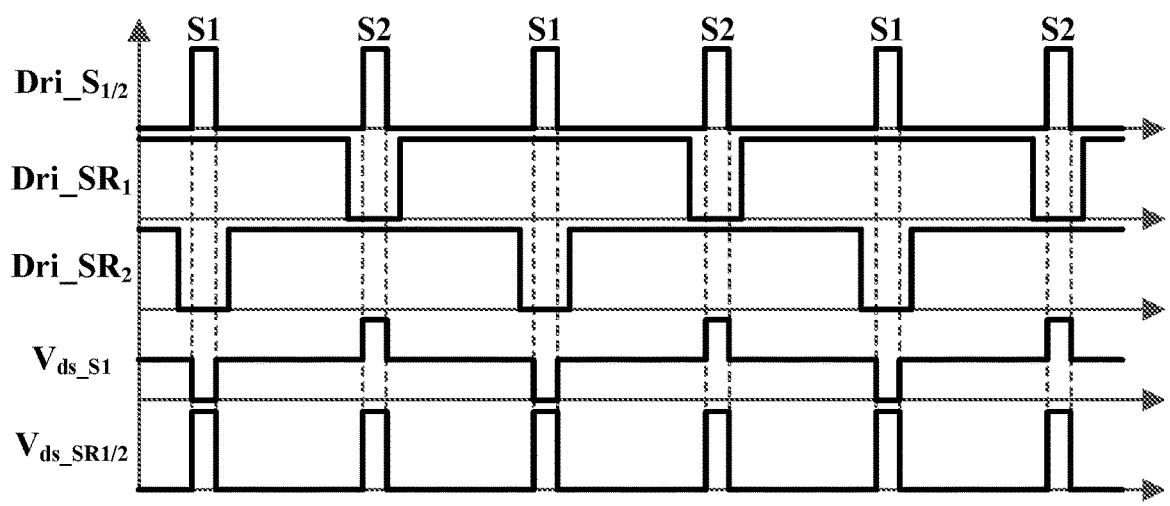
FIG. 2 is an operation waveform diagram of the PWM half-bridge circuit of FIG. 1 in a continuous conduction mode.
Figure 3:
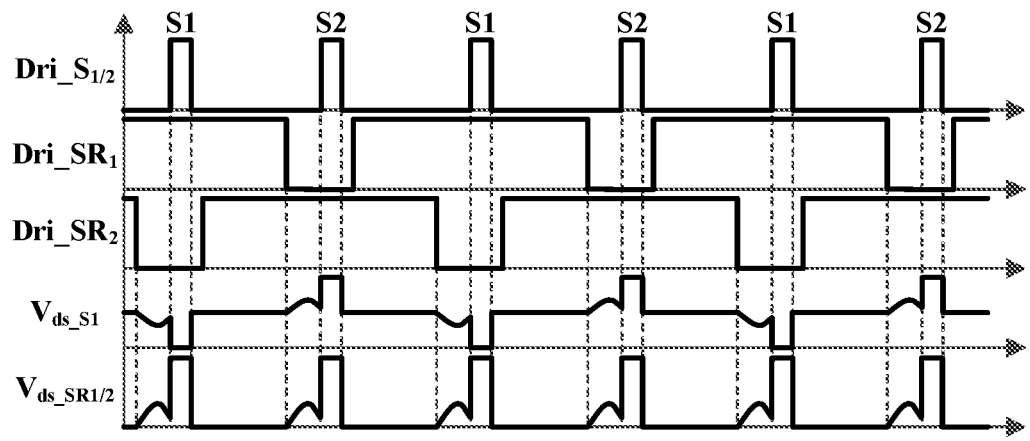
FIG. 3 is an operation waveform diagram of the PWM half-bridge circuit of FIG. 1 in a discontinuous conduction mode.

Before the technical solution of the disclosure is described in details, the conventional PWM half-bridge circuit is introduced firstly. Referring to FIGS. 1-3, they illustrate circuit diagrams of the conventional PWM half-bridge circuit and operation waveforms of the PWM half-bridge circuit in a continuous conduction mode(CCM) and in a discontinuous conduction mode(DCM). The control method of the PWM half-bridge circuit is single voltage loop fixed frequency control, as shown in FIG. 1, according to an output voltage and a given frequency, the PWM half-bridge circuit operates in a continuous conduction mode or a discontinuous conduction mode under different loads, as shown in FIGS. 2 and 3.

When the switch in the primary circuit of the PWM half-bridge circuit is operated in a hard switching state, the loss mainly comprises following two parts: (1). turn-on loss of the primary switch is $P_{loss}=1/2C_{oss}V_{turn\_on}^2f_{sw}$ (wherein $C_{oss}$ is a parasitic capacitance of the primary switch, $V_{turn\_on}$ is a conduction voltage of the primary switch, and $f_{sw}$ is a switching frequency); (2). forced switch of the primary switch produces a large step response, causing oscillation occurs among leakage inductance of the transformer, parasitic capacitance of the transformer and parasitic capacitance of the secondary synchronous rectifier, and the oscillation will be quickly attenuated to 0, and thus loss is generated in the circuit, such loss can be expressed by $P_{loss}=1/2C_{eq}V_{turn\_on}^2f_{sw}$ (wherein $C_{eq}$ is an equivalent capacitance at a primary side of the transformer converted by parasitic capacitance of the transformer and parasitic capacitance of the secondary synchronous rectifier).

When the PWM half-bridge circuit operates in the CCM mode, as shown in FIG. 2, the primary switch is operated in the hard switching state, and the conduction voltage of the primary switch is $V_{in}/2$, so very large loss is generated. When the PWM half-bridge circuit operates in the DCM mode, before the primary switch is turned on, a voltage applied to the primary switch $S_1$ oscillates, as shown in FIG. 3, and the current fixed frequency control causes that turn-on time of the primary switch is uncontrollable. When the primary switch $S_1$ is exactly turned on at peak, the conduction voltage is greater than $V_{in}/2$, and the loss gets larger.

Referring to FIG. 4 again, the PWM half-bridge circuit includes a primary circuit having a primary switching bridge arm, a transformer and a secondary rectifier circuit. The primary switching bridge arm is formed by a first power switch $S_1$ and a second power switch $S_2$ connected in series. The transformer has a primary coil and a secondary coil. The primary coil has both ends coupled to an output end of the primary circuit. The secondary rectifier circuit includes at least two synchronous rectifiers, i.e., synchronous rectifiers $SR_1$ and $SR_2$, and the secondary rectifier circuit has an input end coupled to the secondary coil. The output filter circuit includes an output inductor $L_o$ and an output capacitor $C_o$, and the output filter circuit is electrically coupled between an output end of the secondary rectifier circuit and a load.

It should be noted that the output inductor $L_o$ and the transformer can be integrated together, i.e., integrated in the same magnetic element, thereby reducing a total volume of the magnetic element in the PWM half-bridge circuit, and improving a power density of the converter. Of course, the output inductor $L_o$ and the transformer also can be separate, and the application is not limited thereto.

Further, the control method can be realized by the following steps: controlling the PWM half-bridge circuit to enter into a discontinuous conduction mode by regulating a switching frequency $f_{sw}$, for example, reducing the switching frequency $f_{sw}$; and when the PWM half-bridge circuit operates in the discontinuous conduction mode, oscillation occurs among the output inductor $L_o$, a magnetizing inductor $L_m$ of the transformer and a parasitic capacitor of the PWM half-bridge circuit, and when a midpoint voltage of the primary switching bridge arm reaches a valley or a peak, turning on the corresponding first power switch $S_1$ or second power switch $S_2$. In this embodiment, a midpoint of the primary switching bridge arm is a junction node between the first power switch $S_1$ and the second power switch $S_2$. The parasitic capacitor of the PWM half-bridge circuit may be equivalent to the common parasitic capacitor of the first power switch $S_1$, the second power switch $S_2$, the synchronous rectifiers and the transformer, and can be equivalent to a parasitic capacitor between the midpoint of the primary switching bridge arm and ground.

It should be noted that the lower the switching frequency $f_{sw}$ is, it is easier for the PWM half-bridge circuit to enter into the DCM mode, so when an output is switched from a high voltage to a low voltage, the PWM half-bridge circuit enters into the DCM mode faster by quickly regulating the switching frequency $f_{sw}$, for example, quickly reducing the switching frequency $f_{sw}$. After entering into the DCM mode, in an interval where switch states of the first power switch $S_1$ and the second power switch $S_2$ are switched, i.e., in a dead time of the first power switch $S_1$ and the second power switch $S_2$, oscillation occurs among the output inductor $L_o$, the magnetizing inductor $L_m$ of the transformer and the parasitic capacitor of the PWM half-bridge circuit. Specifically, in a dead time from the second power switch $S_2$ being turned off to the first power switch $S_1$ being turned on, when the midpoint voltage of the primary switching bridge arm is oscillated to the valley, a lower switch of the primary switching bridge arm, i.e., the first power switch $S_1$, is turned on, and in a dead time from the first power switch $S_1$ being turned off to the second power switch $S_2$ being turned on, when the midpoint voltage of the primary switching bridge arm is oscillated to the peak, an upper switch of the primary switching bridge arm, i.e., the second power switch $S_2$, is turned on, thereby reducing switching loss.

Figure 4:
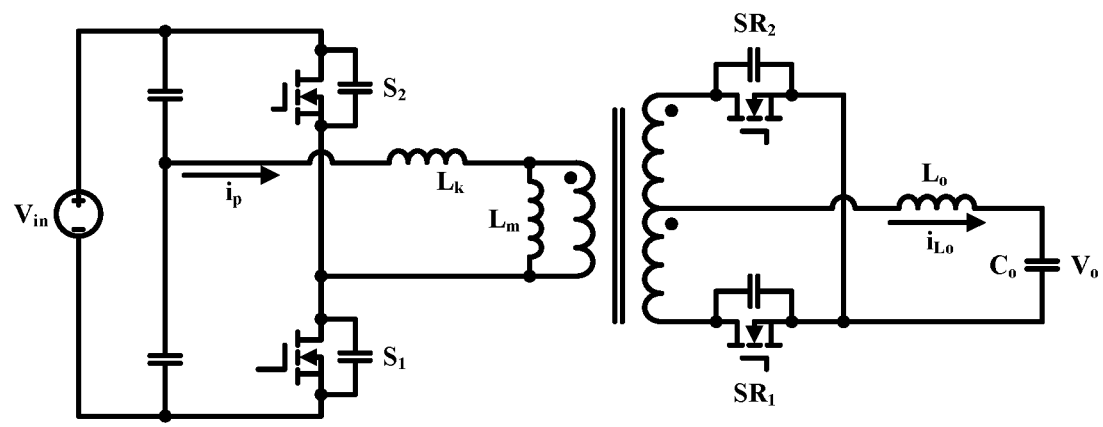
FIG. 4 is a diagram of a PWM half-bridge circuit in a converter suitable for delivering a wide range output voltage according to a first embodiment of the invention.

Referring to FIG. 4, the primary circuit further includes a capacitor bridge arm. The capacitor bridge arm is formed by a first capacitor and a second capacitor connected in series. One end of the primary coil of the transformer is coupled to a midpoint of the capacitor bridge arm, and the midpoint of the capacitor bridge arm is a junction node between the first capacitor and the second capacitor, and the other end of the primary coil is coupled to a midpoint of the primary switching bridge arm. The PWM half-bridge circuit of the disclosure is not limited to a structure in FIG. 4. For example, referring to FIGS. 5 and 6, the primary circuit may further include a capacitor connected to a positive input end or a negative input end of the primary circuit, i.e., one end of the capacitor is electrically coupled to the positive input end or the negative input end of the primary circuit, and the other end of the capacitor is electrically coupled to one end of the primary coil of the transformer, and the other end of the primary coil is electrically coupled to the midpoint of the primary switching bridge arm. It should be noted that the capacitor also can be connected in series to other positions of the primary circuit, for example, connected in series between the other end of the primary coil and the midpoint of the primary switching bridge arm, but the invention is not limited thereto.

Figure 5:
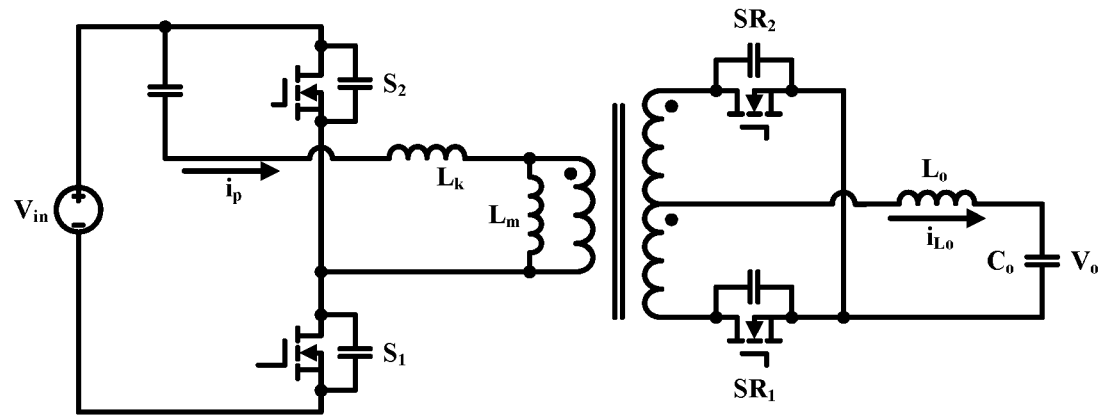
FIG. 5 is a diagram of a PWM half-bridge circuit in a converter suitable for delivering a wide range output voltage according to a second embodiment of the invention.
Figure 6:
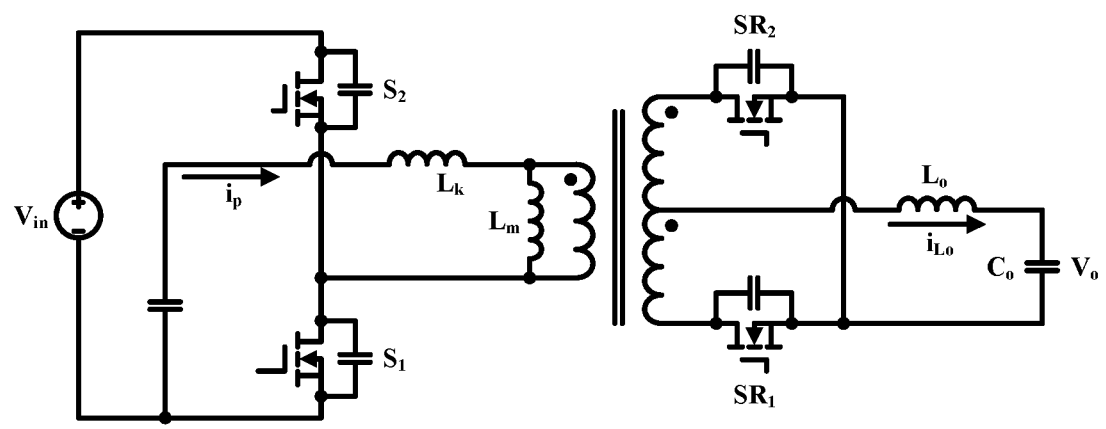
FIG. 6 is a diagram of a PWM half-bridge circuit in a converter suitable for delivering a wide range output voltage according to a third embodiment of the invention.

In some embodiments, the secondary rectifier circuit can be a full wave rectifier circuit or a full bridge rectifier circuit. As shown in FIGS. 4 to 6, when the secondary coil of the transformer uses a center-tapped structure, i.e., the secondary coil of the transformer includes a first end, a second end and a common end, and the secondary rectifier circuit includes a first synchronous rectifier $SR_1$ and a second synchronous rectifier $SR_2$, one end of the first synchronous rectifier $SR_1$ and one end of the second synchronous rectifier $SR_2$ are respectively connected to the first end and the second end of the secondary coil, the other end of the first synchronous rectifier $SR_1$ and the other end of the second synchronous rectifier $SR_2$ are connected to a negative end of the output capacitor $C_o$, and both ends of the output inductor $L_o$ are respectively connected to the common end of the secondary coil and a positive end of the output capacitor $C_o$.

Figure 7:
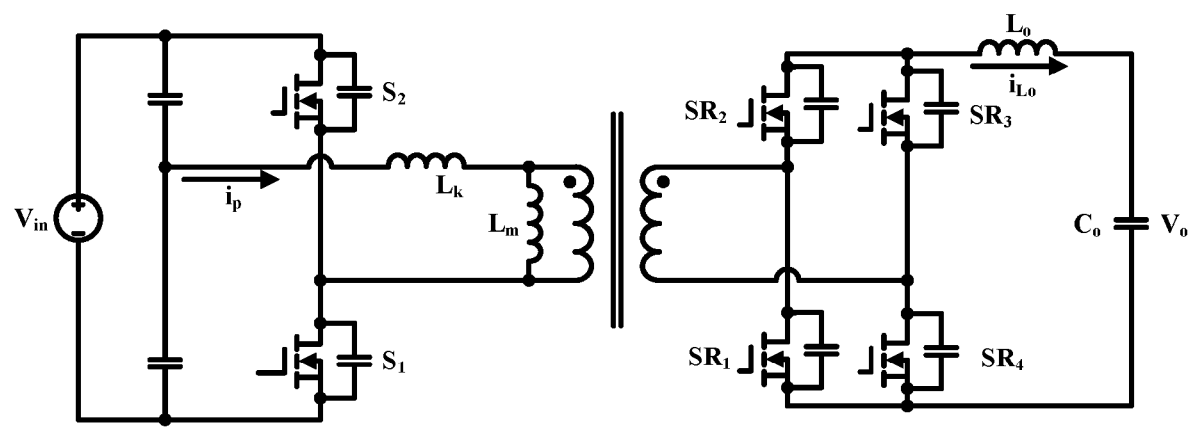
FIG. 7 is a diagram of a PWM half-bridge circuit in a converter suitable for delivering a wide range output voltage according to a fourth embodiment of the invention.

As shown in FIG. 7, when the secondary rectifier circuit uses a full bridge structure, the secondary coil of the transformer includes a first end and a second end, the secondary rectifier circuit includes first to fourth synchronous rectifiers $SR_1$ to $SR_4$. The first synchronous rectifier $SR_1$ and the second synchronous rectifier $SR_2$ are connected in series to form a first rectifier bridge arm, and the third synchronous rectifier $SR_3$ and the fourth synchronous rectifier $SR_4$ are connected in series to form a second rectifier bridge arm. The first end and the second end of the secondary coil are respectively connected to a midpoint of the first rectifier bridge arm and a midpoint of the second rectifier bridge arm, and the output capacitor $C_o$ is connected in parallel to both ends of the first rectifier bridge arm and the second rectifier bridge arm through the output inductor $L_o$.

According to another embodiment of the invention, the first power switch $S_1$ is connected to a negative input end of the primary circuit, the second power switch $S_2$ is connected to a positive input end of the primary circuit. In the dead time from the second power switch $S_2$ being turned off to the first power switch $S_1$ being turned on, when the midpoint voltage of the primary switching bridge arm reaches the valley, the first power switch $S_1$ is turned on; in the dead time from the first power switch $S_1$ being turned off to the second power switch $S_2$ being turned on, when the midpoint voltage of the primary switching bridge arm reaches the peak, the second power switch $S_2$ is turned on.

To further reduce the switching frequency, when the midpoint voltage of the primary switching bridge arm is at the m-th valley, the first power switch $S_1$ is turned on, and when the midpoint voltage of the primary switching bridge arm is at the m-th peak, the second power switch $S_2$ is turned on, where m is an integer greater than or equal to 1. In this embodiment, the value m can be adjustable depending on a size of the load. Generally, the smaller the load is, the larger the value m will be, and the larger the load is, the smaller the value m will be.

In the embodiment shown in FIGS. 4-6, in an interval where switch states of the first power switch $S_1$ and the second power switch $S_2$ are switched, i.e., in a dead time of the two power switches, a current flowing through the first synchronous rectifier $SR_1$ and a current flowing through the second synchronous rectifier $SR_2$ are detected, and according to the currents flowing through the synchronous rectifiers, the corresponding synchronous rectifier is turned off or maintained in conduction state. In this embodiment, in the dead time from the first power switch $S_1$ being turned off to the second power switch $S_2$ being turned on, the current flowing through the first synchronous rectifier $SR_1$ is linearly decreased, and when the current flowing through the first synchronous rectifier $SR_1$ is decreased to 0, the first synchronous rectifier $SR_1$ is turned off, and the second synchronous rectifier $SR_2$ is maintained in a conduction state, such that continuous oscillation occurs among the output inductor $L_o$, the magnetizing inductor $L_m$ of the transformer and the parasitic capacitor of the PWM half-bridge circuit. In the dead time from the second power switch $S_2$ being turned off to the first power switch $S_1$ being turned on, the current flowing through the second synchronous rectifier $SR_2$ is linearly decreased, and when the current flowing through the second synchronous rectifier $SR_2$ is decreased to 0, the second synchronous rectifier $SR_2$ is turned off, and the first synchronous rectifier $SR_1$ is maintained in a conduction state, such that continuous oscillation occurs among the output inductor $L_o$, the magnetizing inductor $L_m$ of the transformer and the parasitic capacitor of the PWM half-bridge circuit.

Figure 8:
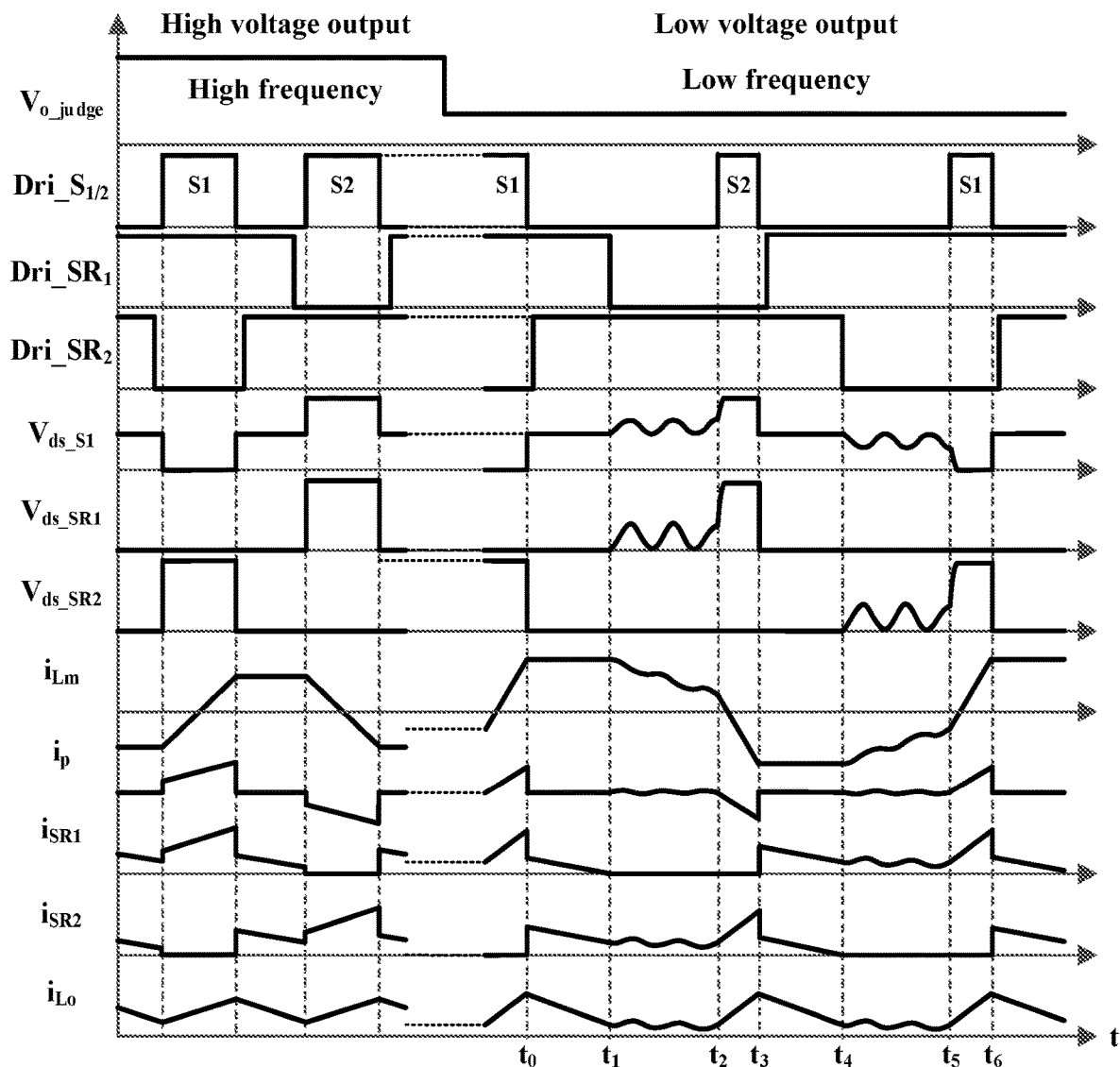
FIG. 8 is an operation waveform diagram of the PWM half-bridge circuit according to the first embodiment of the invention.

Referring to FIG. 8, the left portion is operation waveforms of the PWM half-bridge circuit at a high voltage and heavy load output. At this time, the PWM half-bridge circuit operates in the CCM mode, and a high switching frequency $f_{sw}$ is set to reduce an output current ripple, thereby reducing a dimension of the output inductor and loss. The right portion of FIG. 8 is operation waveforms of the PWM half-bridge circuit at a low voltage and light load output, and at the low voltage output, a current desired by the system is also small, so a ratio of the switching loss gets larger, and quick frequency reduction is required to enter into the discontinuous conduction mode, thereby realizing conduction of the primary switch at a valley, and reducing switching loss.

Hereinafter valley control of the PWM half-bridge circuit of the disclosure under the discontinuous conduction mode is further described in details by examples with reference to FIG. 8.

Phase [$t_0$-$t_1$]:

At time $t_0$, the first power switch $S_1$ is turned off, a voltage $V_{ds\_S1}$ withstood by $S_1$ is changed from 0V to $V_{in}/2$ (wherein $V_{in}$ is an input voltage), a primary current $i_p$ is changed from a peak current $i_{p\_pk}$ to 0A, a current $i_{Lm}$ flowing through the magnetizing inductor $L_m$ is maintains at a peak current $i_{Lm\_pk}$, a voltage $V_{ds\_SR2}$ withstood by the second synchronous rectifier $SR_2$ is changed from $V_{in}/n$ (where n is a turn ratio of the transformer) to 0, and the second synchronous rectifier $SR_2$ is turned on. At this time, the first synchronous rectifier $SR_1$ is in a conduction state, and a current $i_{Lo}$ on the output inductor $L_o$, a current $i_{SR1}$ on the first synchronous rectifier $SR_1$ and a current $i_{SR2}$ on the second synchronous rectifier $SR_2$ are linearly decreased, until the current $i_{SR1}$ on the first synchronous rectifier $SR_1$ is decreased to 0, and the current $i_{SR2}$ and the current $i_{Lo}$ are decreased to $n*i_{Lm\_pk}$ at time $t_1$.

Phase [$t_1$-$t_2$]:

At time $t_1$, the current $i_{SR1}$ on the first synchronous rectifier $SR_1$ is decreased to 0, the current $i_{SR2}$ on the second synchronous rectifier $SR_2$ and the current $i_{Lo}$ on the output inductor are decreased to $n*i_{Lm\_pk}$, the first synchronous rectifier $SR_1$ is controlled to turn off, the second synchronous rectifier $SR_2$ is maintained in a conduction state, oscillation occurs among the output inductor $L_o$, the magnetizing inductor $L_m$ of the transformer and the parasitic capacitor of the PWM half-bridge circuit, the voltage $V_{ds\_S1}$ withstood by the first power switch $S_1$ oscillates with $$\left(\frac{V_{in}}{2} + \frac{nL_m V_o}{L_m + n^2 L_o}\right)$$

with as the balance point and $$\frac{nL_m V_o}{L_m + n^2 L_o}$$

as the amplitude, the voltage $V_{ds\_SR1}$ withstood by the first synchronous rectifier $SR_1$ oscillates with $$\frac{2L_m V_o}{L_m + n^2 L_o}$$

as the balance point and $$\frac{2L_m V_o}{L_m + n^2 L_o}$$

as the amplitude, and the current $i_{Lo}$ flowing through the output inductor oscillates with a linearly decreased current as the balance point and another specific amplitude. Moreover, the above three oscillation periods are the same, and equal to $$2\pi\sqrt{\frac{n^2 L_m L_o C_{EQ}}{n^2 L_o + L_m}}$$

(wherein $C_{EQ}$ is the parasitic capacitance of the PWM half-bridge circuit). The above oscillations continue, until the voltage $V_{ds\_S1}$ withstood by the first power switch $S_1$ is at the oscillated peak, and correspondingly, the voltage withstood by the second power switch $S_2$ is at the oscillated valley at time $t_2$. It should be noted that in order to further reduce the switching frequency $f_{sw}$, and improve light load efficiency, the time $t_2$ can be selected at the m-th peak, and the value of m is associated with a size of the load and the switching frequency $f_{sw}$.

Phase [$t_2$-$t_3$]:

At time $t_2$, the voltage $V_{ds\_S1}$ withstood by the first power switch $S_1$ is at peak of the oscillation, and the second power switch $S_2$ can be turned on at the valley. Meanwhile, the primary current $i_p$ and the current $i_{Lm}$ flowing through the magnetizing inductor are linearly decreased, and the current $i_{Lo}$ flowing through the output inductor is linearly increased, until the primary current $i_p$ reaches a negative peak current $-i_{p\_pk}$ at time $t_3$.

Phase [$t_3$-$t_4$]:

At time $t_3$, the primary current $i_p$ reaches the negative peak value, the second power switch $S_2$ is turned off, the voltage $V_{ds\_S1}$ withstood by the first power switch $S_1$ is changed from $V_{in}$ to $V_{in}/2$, the primary current $i_p$ is changed from the negative peak current $-i_{p\_pk}$ to 0A, the current $i_{Lm}$ flowing through the magnetizing inductor $L_m$ is maintained at the negative peak current $-i_{Lm\_pk}$, the voltage $V_{ds\_SR1}$ withstood by the first synchronous rectifier $SR_1$ is changed from $V_{in}/n$ to 0, and the first synchronous rectifier $SR_1$ is turned on. At this time, the second synchronous rectifier $SR_2$ is maintained in a conduction state, and the current $i_{Lo}$ on the output inductor $L_o$, the current $i_{SR1}$ on the first synchronous rectifier $SR_1$ and the current $i_{SR2}$ on the second synchronous rectifier $SR_2$ are linearly decreased, until the current $i_{SR2}$ is decreased to 0, and the current $i_{SR1}$ and $i_{Lo}$ are decreased to $n*i_{Lm\_pk}$ at time $t_4$.

Phase [$t_4$-$t_5$]:

At the time $t_4$, the current $i_{SR2}$ on the second synchronous rectifier $SR_2$ is decreased to 0, the current $i_{SR1}$ on the first synchronous rectifier $SR_1$ and the current $i_{Lo}$ on the output inductor $L_o$ are decreased to $n*i_{Lm\_pk}$, the second synchronous rectifier $SR_2$ is controlled to turn off, the first synchronous rectifier $SR_1$ is maintained in a conduction state, oscillation occurs among the output inductor $L_o$, the magnetizing inductor $L_m$ of the transformer and the parasitic capacitor of the PWM half-bridge circuit, the voltage $V_{ds\_S1}$ withstood by the first power switch $S_1$ oscillates with $$\left(\frac{V_{in}}{2} - \frac{nL_m V_o}{L_m + n^2 L_o}\right)$$

as me balance point and $$\frac{nL_m V_o}{L_m + n^2 L_o}$$

as the amplitude, the voltage $V_{ds\_SR2}$ withstood by the second synchronous rectifier $SR_2$ oscillates with $$\frac{2L_m V_o}{L_m + n^2 L_o}$$

as the balance point and $$\frac{2L_m V_o}{L_m + n^2 L_o}$$

as the amplitude, and the current $i_{Lo}$ flowing through the output inductor $L_o$ oscillates with a linearly decreased current as the balance point and another specific amplitude. Moreover, the above three oscillation periods are the same, and equal to $$2\pi \sqrt{\frac{n^2 L_m L_o C_{EQ}}{n^2 L_o + L_m}}.$$

The above oscillations continue, until the voltage $V_{ds\_S1}$ withstood by the first power switch $S_1$ is at the oscillated valley at time $t_5$. Similarly, when the load is decreased, quick frequency reduction can be realized by increasing the number of valleys in the period of time $t_4$-$t_5$, thereby reducing switching loss, and improving light load efficiency.

Phase [$t_5$-$t_6$]:

At time $t_5$, the voltage $V_{ds\_S1}$ withstood by the first power switch $S_1$ is at valley of the oscillation, and the first power switch $S_1$ can be turned on at the valley. Meanwhile, the primary current $i_p$, the current $i_{Lm}$ flowing through the magnetizing inductor and the current $i_{Lo}$ flowing through the output inductor are linearly increased, until the primary current $i_p$ reaches a peak current at time $t_6$, and the first power switch $S_1$ is turned off. Then the process described above is repeated.

According to another embodiment of the invention, the disclosure further provides a method for controlling a converter suitable for delivering a wide range output voltage to a load. When the load is further decreased, the PWM half-bridge circuit enters into a BURST mode from the discontinuous conduction mode, and each BURST period includes a pulse enabled interval (also referred to as Burst ON) during which the PWM half-bridge circuit operates in the discontinuous conduction mode, and a pulse disabled interval (also referred to as Burst OFF) during which all pulse signals are stopped, i.e., driving signals of the primary circuit and the secondary rectifier circuit are stopped, such that the PWM half-bridge circuit stops operation.

Further, in each of the pulse enabled intervals (Burst ON), the first switching period is processed, for example, shortening the first switching period, such that the current $i_{Lm}$ flowing through the magnetizing inductor and the current $i_{Lo}$ flowing through the output inductor access to a predetermined trajectory, and the final switching period is processed, for example, shortening the final switching period, such that a pulse signal of the primary circuit is stopped when the current $i_{Lm}$ flowing through the magnetizing inductor is zero, thereby avoiding loss and oscillation. As for the remaining switching periods during Burst ON, a switching frequency and a duty cycle can be maintained constant. It should be noted that the predetermined trajectory is a trajectory of the current of the magnetizing inductor and the current of the output inductor in the discontinuous conduction mode.

In some embodiments, the number of switching periods in the pulse enabled interval is fixed, and a frequency for alternating the pulse enabled interval and the pulse disabled interval is regulated according to a size of the load. That is, the Burst frequency is regulated according to the size of the load, the larger the load is, the higher the frequency will be, and the smaller the load is, the lower the frequency will be. Alternatively, the frequency for alternating the pulse enabled interval and the pulse disabled interval is fixed, i.e., fixing the Burst frequency, and the number of switching periods in the pulse enabled interval is regulated according to the size of the load. The larger the load is, the more the number will be, and the smaller the load is, the less the number will be.

Figure 9:
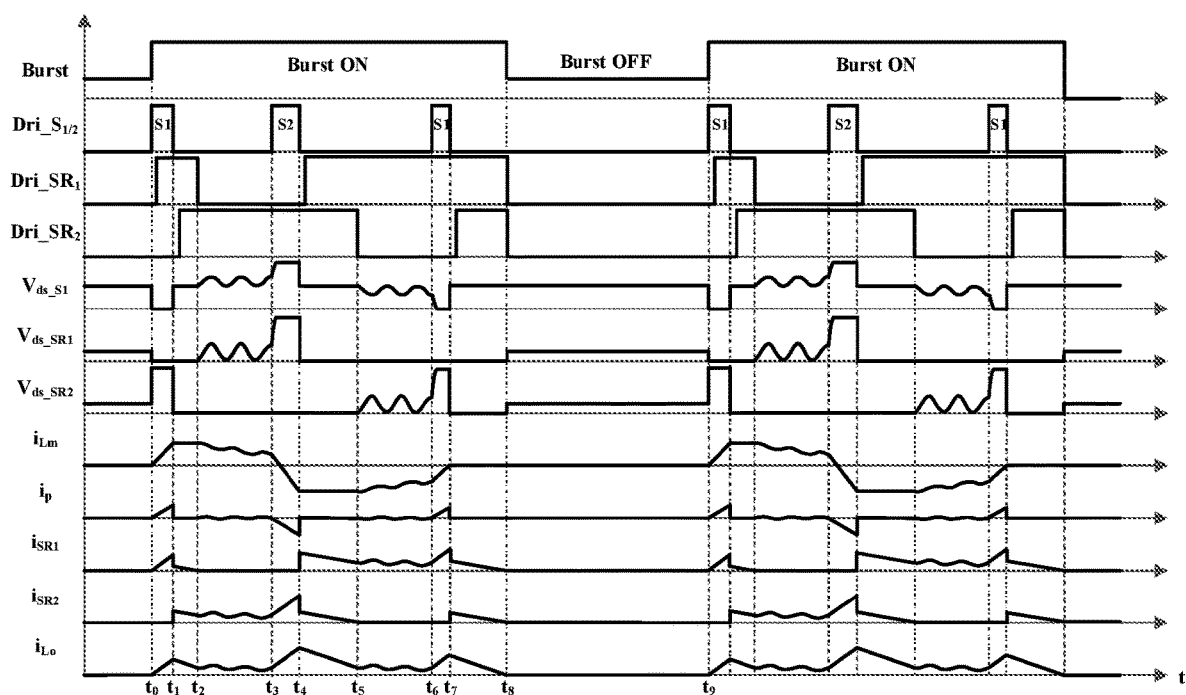
FIG. 9 is an operation waveform diagram of the PWM half-bridge circuit according to the first embodiment of the invention in a BURST mode.

Hereinafter taking a center-tapped structure of the secondary coil of the transformer for example, specific control process is shown in FIG. 9.

Phase [$t_0$-$t_1$]:

At time $t_0$, the circuit enters into Burst ON state, the first power switch $S_1$ is turned on, the voltage $V_{ds\_S1}$ withstood by the first power switch $S_1$ is changed from $V_{in}/2$ to 0, the voltage $V_{ds\_SR1}$ withstood by the first synchronous rectifier $SR_1$ is changed from $V_o$ to 0, and the first synchronous rectifier $SR_1$ is turned on. Meanwhile, the voltage $V_{ds\_SR2}$ withstood by the second synchronous rectifier $SR_2$ is changed from $V_o$ to $V_{in}/n$, and the primary current $i_p$, the current $i_{Lm}$ flowing through the magnetizing inductor and the current $i_{Lo}$ flowing through the output inductor are linearly increased from zero, until the current $i_{Lm}$ flowing through the magnetizing inductor reaches a peak value at time $t_1$. Since the current $i_{Lm}$ flowing through the magnetizing inductor cannot be detected, this period of time can be obtained by computation of a control chip.

Phase [$t_1$-$t_6$]:

At the time $t_1$, the first power switch $S_1$ is turned off, and an operating process in the period from time $t_1$ to $t_6$ is the same as that from time $t_0$ to $t_5$ in FIG. 8, so the details are not described here. In this period of time, a switching frequency and a conduction time are maintained constant, until the final switching period in the current Burst ON state is entered at time $t_6$.

Phase [$t_6$-$t_7$]:

At time $t_6$, the final switching period in the current Burst ON state is entered, the first power switch $S_1$ is turned on, the primary current $i_p$, the current $i_{Lm}$ flowing through the magnetizing inductor and the current $i_{Lo}$ flowing through the output inductor are linearly increased, until the current $i_{Lm}$ flowing through the magnetizing inductor reaches 0 from negative value at time $t_7$. Similarly, time $t_6$-$t_7$ can be obtained by computation.

Phase [$t_7$-$t_8$]:

At the time $t_7$, the first power switch $S_1$ is turned off, the voltage $V_{ds\_S1}$ withstood by $S_1$ is changed from 0 to $V_{in}/2$, the voltage $V_{ds\_SR2}$ withstood by the second synchronous rectifier $SR_2$ is changed from $V_{in}/n$ to 0, and the second synchronous rectifier $SR_2$ is turned on. At this time, the first synchronous rectifier $SR_1$ is in a conduction state, the primary current $i_p$ and the current $i_{Lm}$ are maintained at 0, and the current $i_{Lo}$ flowing through the output inductor is linearly decreased, until the current $i_{Lo}$ is decreased to 0 at time $t_8$.

Phase [$t_8$-$t_9$]:

At time $t_8$, the current $i_{Lo}$ is decreased to 0, the first power switch $S_1$, the second power switch $S_2$, and the synchronous rectifiers $SR_1$ and $SR_2$ are turned off, and voltages withstood by the first power switch $S_1$ and the second power switch $S_2$ are $V_{in}/2$, and voltages withstood by the synchronous rectifiers $SR_1$ and $SR_2$ are changed from 0 to $V_o$. The circuit enters into Burst OFF state, until the Burst ON state is re-entered again at a time $t_9$. Then the process described above is repeated.

It should be noted that the first and final switching periods in the Burst ON interval are not necessarily correspond to the first power switch $S_1$, and also can be the second power switch $S_2$, and operating manners are the same.

According to another embodiment of the invention, the control manner in FIG. 9 also can be applied to the PWM half-bridge circuit where a secondary side of FIG. 7 is a full bridge rectifier circuit. The first synchronous rectifier $SR_1$ and the third synchronous rectifier $SR_3$ operate synchronously, and the second synchronous rectifier $SR_2$ and the fourth synchronous rectifier $SR_4$ operate synchronously. That is, after the first power switch $S_1$ is turned off, the first synchronous rectifier $SR_1$ and the third synchronous rectifier $SR_3$ are controlled to turn on, the second synchronous rectifier $SR_2$ and the fourth synchronous rectifier $SR_4$ are maintained in a conduction state, the current $i_{SR1}$ on the first synchronous rectifier $SR_1$, the current $i_{SR2}$ on the second synchronous rectifier $SR_2$, the current $i_{SR3}$ on the third synchronous rectifier $SR_3$, and the current $i_{SR4}$ on the fourth synchronous rectifier $SR_4$ are linearly decreased, until the current $i_{SR2}$ and $i_{SR4}$ are decreased to 0, the second synchronous rectifier $SR_2$ and the fourth synchronous rectifier $SR_4$ are controlled to turn off, and the first synchronous rectifier $SR_1$ and the third synchronous rectifier $SR_3$ are maintained in a conduction state, such that oscillation occurs among the output inductor $L_o$, the magnetizing inductor $L_m$ and the parasitic capacitor of the PWM half-bridge circuit, and when the voltage $V_{ds\_S1}$ withstood by the first power switch $S_1$ is at the oscillated m-th peak, the second power switch $S_2$ is turned on. Similarly, after the second power switch $S_2$ is turned off, the second synchronous rectifier $SR_2$ and the fourth synchronous rectifier $SR_4$ are controlled to turn on, the first synchronous rectifier $SR_1$ and the third synchronous rectifier $SR_3$ are maintained in a conduction state, the current $i_{SR1}$ on the first synchronous rectifier $SR_1$, the current $i_{SR2}$ on the second synchronous rectifier $SR_2$, the current $i_{SR3}$ on the third synchronous rectifier $SR_3$, and the current $i_{SR4}$ on the fourth synchronous rectifier $SR_4$ are linearly decreased, until the current $i_{SR1}$ and $i_{SR3}$ are decreased to 0, the first synchronous rectifier $SR_1$ and the third synchronous rectifier $SR_3$ are controlled to turn off, and the second synchronous rectifier $SR_2$ and the fourth synchronous rectifier $SR_4$ are maintained in a conduction state, such that oscillation occurs among the output inductor $L_o$, the magnetizing inductor $L_m$ and the parasitic capacitor of the PWM half-bridge circuit, and when the voltage $V_{ds\_S1}$ withstood by the first power switch $S_1$ is at the oscillated m-th valley, the first power switch $S_2$ is turned on.

According to another embodiment of the invention, the disclosure further provides a converter suitable for delivering a wide range output voltage to a load. The converter includes a PWM half-bridge circuit and a control unit. The PWM half-bridge circuit includes a primary circuit, a transformer, a secondary rectifier circuit, an output filter circuit and a control unit. The primary circuit includes a primary switching bridge arm formed by a first power switch $S_1$ and a second power switch $S_2$ connected in series. The transformer includes a primary coil and a secondary coil magnetically coupled to each other. The primary coil is coupled to an output end of the primary circuit. The secondary rectifier circuit includes at least two synchronous rectifiers, and the secondary rectifier circuit has an input end coupled to the secondary coil. The output filter circuit includes an output inductor and an output capacitor, and the output filter circuit is electrically coupled between an output end of the secondary rectifier circuit and a load. The control unit is coupled to the PWM half-bridge circuit (e.g., in communication connection by a wired or wireless manner), and configured to control the PWM half-bridge circuit to enter into a discontinuous conduction mode by regulating a switching frequency (e.g., reducing a switching frequency), after the PWM half-bridge circuit enters into the discontinuous conduction mode, oscillation occurs among the output inductor, an magnetizing inductor of the transformer and a parasitic capacitor of the PWM half-bridge circuit, and when a midpoint voltage of the primary switching bridge arm reaches a valley or a peak, the control unit is configured to turn on the corresponding first power switch $S_1$ or second power switch $S_2$. The parasitic capacitor is a common equivalent parasitic capacitor of the synchronous rectifiers, the first power switch $S_1$, the second power switch $S_2$, and the transformer, and can be equivalent to a parasitic capacitor between the midpoint of the primary switching bridge arm and ground. It is understood by a person having ordinary skill in the art("POSITA") that, in some embodiments, the PWM half-bridge circuit works in the discontinuous conduction mode at a light load, and in some other embodiments, the PWM half-bridge circuit works in the continuous conduction mode at a heavy load, and in some embodiments, the PWM half-bridge circuit works in the discontinuous conduction mode at a full-range load. Here, the full-range load includes a phase of the light load and a phase of the heavy load.

As shown in FIG. 4, the first power switch $S_1$ is connected to a negative input end of the primary circuit, the second power switch $S_2$ is connected to a positive input end of the primary circuit. In a dead time from the second power switch $S_2$ being turned off to the first power switch $S_1$ being turned on, when the midpoint voltage of the primary switching bridge arm reaches the valley, the control unit turns on the first power switch $S_1$; in a dead time from the first power switch $S_1$ being turned off to the second power switch $S_2$ being turned on, when the midpoint voltage of the primary switching bridge arm reaches the peak, the control unit turns on the second power switch $S_2$.

To further reduce the switching frequency, and improve efficiency at a light load, in the dead time from the second power switch $S_2$ being turned off to the first power switch $S_1$ being turned on, when the midpoint voltage of the primary switching bridge arm is at the m-th valley, the control unit turns on the first power switch $S_1$, and in the dead time from the first power switch $S_1$ being turned off to the second power switch $S_2$ being turned on, when the midpoint voltage of the primary switching bridge arm is at the m-th peak, the control unit turns on the second power switch $S_2$, where m is an integer greater than or equal to 1.

The control unit determines the value m according to a size of the load. In detail, when the load is decreased, increases the value m, and when the load is increased, decreases the value m.

In some embodiments, the second rectifier circuit may be configured as a full wave rectifier circuit, as shown in FIGS. 4-6, the secondary coil of the transformer is a center-tapped structure, and the secondary coil includes a first end, a second end and a common end. The secondary rectifier circuit includes a first synchronous rectifier $SR_1$ and a second synchronous rectifier $SR_2$, one end of the first synchronous rectifier $SR_1$ and one end of the second synchronous rectifier $SR_2$ are respectively connected to the first end and the second end of the secondary coil. The other end of the first synchronous rectifier $SR_1$ and the other end of the second synchronous rectifier $SR_2$ are connected to a negative end of the output capacitor $C_o$, and both ends of the output inductor $L_o$ are respectively connected to the common end of the secondary coil and a positive end of the output capacitor $C_o$.

Further, in this embodiment, the converter further includes a current detection unit for detecting a current flowing through the first synchronous rectifier $SR_1$ and a current flowing through the second synchronous rectifier $SR_2$, and for sending a detection result to the control unit. In the dead time from the first power switch $S_1$ being turned off to the second power switch $S_2$ being turned on, the current flowing through the first synchronous rectifier $SR_1$ is linearly decreased, and when the current is decreased to 0, the control unit controls the first synchronous rectifier $SR_1$ to turn off, and maintains the second synchronous rectifier $SR_2$ in a conduction state, such that oscillation occurs among the output inductor $L_o$, the magnetizing inductor $L_m$ of the transformer and the parasitic capacitor of the PWM half-bridge circuit. In the dead time from the second power switch $S_2$ being turned off to the first power switch $S_1$ being turned on, the current flowing through the second synchronous rectifier $SR_2$ is linearly decreased, and when the current is decreased to 0, the control unit controls the second synchronous rectifier $SR_2$ to turn off, and maintains the first synchronous rectifier $SR_1$ in a conduction state, such that oscillation occurs among the output inductor $L_o$, the magnetizing inductor $L_m$ of the transformer and the parasitic capacitor of the PWM half-bridge circuit.

In some embodiments, the secondary rectifier circuit may be a full bridge rectifier circuit, as shown in FIG. 7, the secondary coil of the transformer includes a first end and a second end, the secondary rectifier circuit includes first to fourth synchronous rectifiers $SR_1$ to $SR_4$. The first synchronous rectifier $SR_1$ and the second synchronous rectifier $SR_2$ are connected in series to form a first rectifier bridge arm, and the third synchronous rectifier $SR_3$ and the fourth synchronous rectifier $SR_4$ are connected in series to form a second rectifier bridge arm. The first end and the second end of the secondary coil are respectively connected to a midpoint of the first rectifier bridge arm and a midpoint of the second rectifier bridge arm, and the output capacitor $C_o$ is connected in parallel to both ends of the first rectifier bridge arm and the second rectifier bridge arm through the output inductor $L_o$.

Further, in this embodiment, the converter further includes a current detection unit for detecting currents on the first synchronous rectifier $SR_1$, the second synchronous rectifier $SR_2$, the third synchronous rectifier $SR_3$ and the fourth synchronous rectifier $SR_4$, and for sending a detection result to the control unit. The control unit is configured to control the first synchronous rectifier $SR_1$ and the third synchronous rectifier $SR_3$ to operate synchronously, and control the second synchronous rectifier $SR_2$ and the fourth synchronous rectifier $SR_4$ to operate synchronously. After the first power switch $S_1$ is turned off, the control unit controls the first synchronous rectifier $SR_1$ and the third synchronous rectifier $SR_3$ to turn on, and maintain the second synchronous rectifier $SR_2$ and the fourth synchronous rectifier $SR_4$ in a conduction state, such that the current $i_{SR1}$ on the first synchronous rectifier $SR_1$, the current $i_{SR2}$ on the second synchronous rectifier $SR_2$, the current $i_{SR3}$ on the third synchronous rectifier $SR_3$, and the current $i_{SR4}$ on the fourth synchronous rectifier $SR_4$ are linearly decreased, until the current $i_{SR2}$ and $i_{SR4}$ are decreased to 0, the control unit controls the second synchronous rectifier $SR_2$ and the fourth synchronous rectifier $SR_4$ to turn off, and maintains the first synchronous rectifier $SR_1$ and the third synchronous rectifier $SR_3$ in a conduction state, such that oscillation occurs among the output inductor $L_o$, the magnetizing inductor $L_m$ of the transformer and the parasitic capacitor of the PWM half-bridge circuit, and when the voltage $V_{ds\_S1}$ withstood by the first power switch $S_1$ is at the oscillated m-th peak, turn on the second power switch $S_2$. After the second power switch $S_2$ is turned off, the control unit controls the second synchronous rectifier $SR_2$ and the fourth synchronous rectifier $SR_4$ to turn on, and maintains the first synchronous rectifier $SR_1$ and the third synchronous rectifier $SR_3$ in a conduction state, such that the current $i_{SR1}$ on the first synchronous rectifier $SR_1$, the current $i_{SR2}$ on the second synchronous rectifier $SR_2$, the current $i_{SR3}$ on the third synchronous rectifier $SR_3$, and the current $i_{SR4}$ on the fourth synchronous rectifier $SR_4$ are linearly decreased, until the current $i_{SR1}$ and $i_{SR3}$ are decreased to 0, the control unit controls the first synchronous rectifier $SR_1$ and the third synchronous rectifier $SR_3$ to turn off, and maintains the second synchronous rectifier $SR_2$ and the fourth synchronous rectifier $SR_4$ in a conduction state, such that oscillation occurs among the output inductor $L_o$, the magnetizing inductor $L_m$ of the transformer and the parasitic capacitor of the PWM half-bridge circuit, and when the voltage $V_{ds\_S1}$ withstood by the first power switch $S_1$ is at the oscillated m-th valley, turn on the first power switch $S_1$, where m is an integer greater than or equal to 1.

According to another embodiment of the invention, when the load is further decreased, the control unit is configured to control the PWM half-bridge circuit to enter a BURST mode from the discontinuous conduction mode into and each BURST period includes a pulse enabled interval during which the PWM half-bridge circuit operates in the discontinuous conduction mode, and a pulse disabled interval during which all pulse signals are stopped, such that the PWM half-bridge circuit stops operation.

In some embodiments, in each of the pulse enabled intervals (also referred to as Burst ON), the control unit processes the first switching period, such that a current flowing through the magnetizing inductor and a current flowing through the output inductor access to a predetermined trajectory, and processes the final switching period, such that a pulse signal of the primary circuit is stopped when the current flowing through the magnetizing inductor is zero, thereby avoiding loss and oscillation. It should be noted that the predetermined trajectory is a trajectory of the current of the magnetizing inductor and the current of the output inductor in the discontinuous conduction mode.

In some embodiments, the control unit is configured to fix the number of switching periods in the pulse enabled interval, and regulate a frequency for alternating the pulse enabled interval and the pulse disabled interval according to the size of the load, and the larger the load is, the higher the frequency will be.

In some embodiments, the control unit is configured to fix the frequency for alternating the pulse enabled interval and the pulse disabled interval, and regulate the number of switching periods in the pulse enabled interval according to the size of the load, and the larger the load is, the more the number will be.

In some embodiments, the primary circuit further includes a capacitor bridge arm. The capacitor bridge arm is formed by a first capacitor and a second capacitor connected in series, as shown in FIG. 4. One end of the primary coil of the transformer is coupled to a midpoint of the capacitor bridge arm, and the other end of the primary coil is coupled to a midpoint of the primary switching bridge arm. In addition, as for specific structure of the primary circuit, it also can be that in the embodiments of FIGS. 5 and 6, but the disclosure is not limited thereto.

The disclosure introduces the PWM half-bridge circuit to enter into the discontinuous conduction mode (DCM) faster by quickly regulating the switching frequency (e.g., reducing the switching frequency) when an output of the converter is switched from a high voltage to a low voltage, after the PWM half-bridge circuit enters into the discontinuous conduction mode, continuous oscillation occurs among the output inductor, the magnetizing inductor of the transformer and the parasitic capacitor of the PWM half-bridge circuit, and when the midpoint voltage of the primary switching bridge arm reaches a valley or a peak, a lower switch or an upper switch of the primary switching bridge arm is turned on correspondingly, thereby reducing switching loss. In addition, when the load is further decreased, the PWM half-bridge circuit is controlled to enter into a BURST mode from the discontinuous conduction mode (DCM).

Although the invention has been disclosed in the embodiments, the invention is not limited thereto. Any skilled in the art shall make various changes and modifications without departing from spirit and scope of the invention, so the protection scope of the invention shall be determined by the scope defined by the appended claims.

What is claimed is:

1. A method for controlling a converter suitable for delivering a wide range output voltage to a load, comprising:
   providing a converter, wherein the converter comprises a PWM half-bridge circuit, and the PWM half-bridge circuit comprises:
      a primary circuit comprising a primary switching bridge arm formed by a first power switch and a second power switch connected in series;
      a transformer comprising a primary coil coupled to the primary circuit, and a secondary coil;
      a secondary rectifier circuit comprising at least two synchronous rectifiers, and each of the at least two synchronous rectifiers having an input end coupled to the secondary coil; and
      an output filter circuit comprising an output inductor and an output capacitor, and coupled between an output end of the secondary rectifier circuit and the load;
   controlling the PWM half-bridge circuit to enter into a discontinuous conduction mode by regulating a switching frequency;
   when the PWM half-bridge circuit operates in the discontinuous conduction mode, oscillation occurs among the output inductor, a magnetizing inductor of the transformer and a parasitic capacitor of the PWM half-bridge circuit, and when a midpoint voltage of the primary switching bridge arm reaches a valley or a peak, turning on the corresponding first power switch or second power switch.

2. The control method according to claim 1,
   wherein the first power switch is connected to a negative input end of the primary circuit, and the second power switch is connected to a positive input end of the primary circuit;
   wherein the control method further comprises:
      in a dead time from the second power switch being turned off to the first power switch being turned on, when the midpoint voltage of the primary switching bridge arm reaches the valley, turning on the first power switch; and
      in a dead time from the first power switch being turned off to the second power switch being turned on, when the midpoint voltage of the primary switching bridge arm reaches the peak, turning on the second power switch.

3. The control method according to claim 2, wherein when the midpoint voltage of the primary switching bridge arm is at the m-th valley, turning on the first power switch;
   when the midpoint voltage of the primary switching bridge arm is at the m-th peak, turning on the second power switch, where m is an integer greater than or equal to 1.

4. The control method according to claim 3, wherein a value of m is determined according to a size of the load, when the load is decreased, the value of m is increased, and when the load is increased, the value of m is decreased.

5. The control method according to claim 1, wherein the secondary coil of the transformer is a center-tapped structure, and the secondary coil comprises a first end, a second end and a common end, the secondary rectifier circuit comprises a first synchronous rectifier and a second synchronous rectifier,
   wherein one end of the first synchronous rectifier and one end of the second synchronous rectifier are respectively connected to the first end and the second end of the secondary coil, and both the other end of the first synchronous rectifier and the other end of the second synchronous rectifier are connected to one end of the output capacitor, and both ends of the output inductor are respectively connected to the common end of the secondary coil and the other end of the output capacitor.

6. The control method according to claim 5, further comprising:
   detecting a current flowing through the first synchronous rectifier and a current flowing through the second synchronous rectifier;
   in a dead time from the first power switch being turned off to the second power switch being turned on, turning off the first synchronous rectifier, and maintaining the second synchronous rectifier in a conduction state when the current flowing through the first synchronous rectifier is decreased to 0, such that an oscillation occurs among the output inductor, the magnetizing inductor of the transformer and the parasitic capacitor;
   in a dead time from the second power switch being turned off to the first power switch being turned on, turning off the second synchronous rectifier, and maintaining the first synchronous rectifier in a conduction state when the current flowing through the second synchronous rectifier is decreased to 0, such that an oscillation occurs among the output inductor, the magnetizing inductor of the transformer and the parasitic capacitor.

7. The control method according to claim 1, wherein the secondary coil of the transformer comprises a first end and a second end, the secondary rectifier circuit comprises first to fourth synchronous rectifiers, the first synchronous rectifier and the second synchronous rectifier are connected in series to form a first rectifier bridge arm, the third synchronous rectifier and the fourth synchronous rectifier are connected in series to form a second rectifier bridge arm, the first end and the second end of the secondary coil are respectively connected to midpoints of the first rectifier bridge arm and the second rectifier bridge arm, and the output capacitor is connected in parallel to both ends of the first rectifier bridge arm and the second rectifier bridge arm through the output inductor.

8. The control method according to claim 7, further comprising:
   controlling the first synchronous rectifier and the third synchronous rectifier to operate synchronously, and controlling the second synchronous rectifier and the fourth synchronous rectifier to operate synchronously;

in a dead time from the first power switch being turned off to the second power switch being turned on, turning off the second synchronous rectifier and the fourth synchronous rectifier, and maintaining the first synchronous rectifier and the third synchronous rectifier in a conduction state when currents flowing through the second synchronous rectifier and the fourth synchronous rectifier are decreased to 0, such that an oscillation occurs among the output inductor, the magnetizing inductor of the transformer and the parasitic capacitor; and in a dead time from the second power switch being turned off to the first power switch being turned on, turning off the first synchronous rectifier and the third synchronous rectifier, and maintaining the second synchronous rectifier and the fourth synchronous rectifier in a conduction state when currents flowing through the first synchronous rectifier and the third synchronous rectifier are decreased to 0, such that an oscillation occurs among the output inductor, the magnetizing inductor of the transformer and the parasitic capacitor.

9. The control method according to claim 1, further comprising:

when the load is further decreased, controlling the PWM half-bridge circuit to enter into a BURST mode from the discontinuous conduction mode, wherein each BURST period comprises a pulse enabled interval during which the PWM half-bridge circuit operates in the discontinuous conduction mode, and a pulse disabled interval during which all pulse signals are stopped, such that the PWM half-bridge circuit stops operation.

10. The control method according to claim 9, wherein in each of the pulse enabled intervals, processing the first switching period, such that a current flowing through the magnetizing inductor and a current flowing through the output inductor access to a predetermined trajectory; and processing the final switching period, such that a pulse signal of the primary circuit is stopped when the current flowing through the magnetizing inductor is zero.

11. The control method according to claim 9, wherein the number of switching periods in the pulse enabled interval is fixed, a frequency for alternating the pulse enabled interval and the pulse disabled interval is regulated according to a state of the load, and the frequency is proportional to the size of the load.

12. The control method according to claim 9, wherein a frequency for alternating the pulse enabled interval and the pulse disabled interval is held fixed, the number of switching periods in the pulse enabled interval is regulated according to a size of the load, and the number is proportional to the size of the load.

13. A converter suitable for delivering a wide range output voltage to a load, comprising:

a PWM half-bridge circuit, wherein the PWM half-bridge circuit comprises:

a primary circuit comprising a primary switching bridge arm formed by a first power switch and a second power switch connected in series;

a transformer comprising a primary coil coupled to the primary circuit, and a secondary coil;

a secondary rectifier circuit comprising at least two synchronous rectifiers, and each of the at least two synchronous rectifiers having an input end coupled to the secondary coil; and an output filter circuit comprising an output inductor and an output capacitor, and coupled between an output end of the secondary rectifier circuit and the load; and a control unit, wherein the control unit configured to:

control the PWM half-bridge circuit to enter into a discontinuous conduction mode by regulating a switching frequency, when the PWM half-bridge circuit operates in the discontinuous conduction mode, oscillation occurs among the output inductor, a magnetizing inductor of the transformer and a parasitic capacitor of the PWM half-bridge circuit, and when a midpoint voltage of the primary switching bridge arm reaches a valley or a peak, turn on the corresponding first power switch or second power switch.

14. The converter according to claim 13, wherein the first power switch is connected to a negative input end of the primary circuit, and the second power switch is connected to a positive input end of the primary circuit; and the control unit is configured to:

in a dead time from the second power switch being turned off to the first power switch being turned on, turn on the first power switch when the midpoint voltage of the primary switching bridge arm reaches the m-th valley; and in a dead time from the first power switch being turned off to the second power switch being turned on, turn on the second power switch when the midpoint voltage of the primary switching bridge arm reaches the m-th peak, where m is an integer greater than or equal to 1.

15. The converter according to claim 14, wherein the control unit determines a value of m according to a size of the load, when the load is decreased, the control unit increases the value of m, and when the load is increased, the control unit decreases the value of m.

16. The converter according to claim 13, wherein the secondary coil of the transformer is a center-tapped structure, and the secondary coil comprises a first end, a second end and a common end, the secondary rectifier circuit comprises a first synchronous rectifier and a second synchronous rectifier, one end of the first synchronous rectifier and one end of the second synchronous rectifier are respectively connected to the first end and the second end of the secondary coil, the other end of the first synchronous rectifier and the other end of the second synchronous rectifier are connected to one end of the output capacitor, and both ends of the output inductor are respectively connected to the common end of the secondary coil and the other end of the output capacitor.

17. The converter according to claim 16, further comprising a current detection unit for detecting a current flowing through the first synchronous rectifier and a current flowing through the second synchronous rectifier, and sending a detection result to the control unit;

wherein the control unit is configured to:

in a dead time from the first power switch being turned off to the second power switch being turned on, turn off the first synchronous rectifier, and maintain the second synchronous rectifier in a conduction state when the current flowing through the first synchronous rectifier is decreased to 0, such that an oscillation occurs among the output inductor, the magnetizing inductor and the parasitic capacitor; and in a dead time from the second power switch being turned off to the first power switch being turned on, turn off the second synchronous rectifier, and maintain the first synchronous rectifier in a conduction state when the current flowing through the second synchronous rectifier is decreased to 0, such that an oscillation occurs among the output inductor, the magnetizing inductor and the parasitic capacitor.

18. The converter according to claim 13, wherein the secondary coil of the transformer comprises a first end and a second end, the secondary rectifier circuit comprises first to fourth synchronous rectifiers, the first synchronous rectifier and the second synchronous rectifier are connected in series to form a first rectifier bridge arm, the third synchronous rectifier and the fourth synchronous rectifier are connected in series to form a second rectifier bridge arm, the first end and the second end of the secondary coil are respectively connected to a midpoint of the first rectifier bridge arm and a midpoint of the second rectifier bridge arm, and the output capacitor is connected in parallel to both ends of the first rectifier bridge arm and the second rectifier bridge arm through the output inductor.

19. The converter according to claim 18, wherein the control unit is configured to:
control the first synchronous rectifier and the third synchronous rectifier to operate synchronously, and control the second synchronous rectifier and the fourth synchronous rectifier to operate synchronously;
in a dead time from the first power switch being turned off to the second power switch being turned on, turn off the second synchronous rectifier and the fourth synchronous rectifier, and maintain the first synchronous rectifier and the third synchronous rectifier in a conduction state when currents on the second synchronous rectifier and the fourth synchronous rectifier are decreased to 0, such that the an oscillation occurs among output inductor, the magnetizing inductor of the transformer and the parasitic capacitor; and
in a dead time from the second power switch being turned off to the first power switch being turned on, turn off the first synchronous rectifier and the third synchronous rectifier, and maintain the second synchronous rectifier and the fourth synchronous rectifier in a conduction state when currents on the first synchronous rectifier and the third synchronous rectifier are decreased to 0, such that an oscillation occurs among the output inductor, the magnetizing inductor of the transformer and the parasitic capacitor.

20. The converter according to claim 13, wherein the control unit is configured to control the PWM half-bridge circuit to enter into a BURST mode from the discontinuous conduction mode when the load is further decreased,
wherein each BURST period comprises a pulse enabled interval during which the PWM half-bridge circuit operates in the discontinuous conduction mode, and a pulse disabled interval during which all pulse signals are stopped, such that the PWM half-bridge circuit stops operation.

21. The converter according to claim 20, wherein in each of the pulse enabled intervals, the control unit processes the first switching period, such that a current flowing through the magnetizing inductor and a current flowing through the output inductor access to a predetermined trajectory; and processes the final switching period, such that a pulse signal of the primary circuit is stopped when the current flowing through the magnetizing inductor is zero.

22. The converter according to claim 13, wherein the primary circuit further comprises a capacitor bridge arm formed by a first capacitor and a second capacitor connected in series, one end of the primary coil of the transformer is coupled to a midpoint of the capacitor bridge arm, and the other end of the primary coil is coupled to a midpoint of the primary switching bridge arm.

23. The converter according to claim 13, wherein the primary circuit further comprises a capacitor having one end coupled to a positive input end or a negative input end of the primary circuit, and the other end coupled to one end of the primary coil, and the other end of the primary coil is coupled to a midpoint of the primary switching bridge arm.

24. The converter according to claim 13, wherein the output inductor and the transformer are integrated together.

25. The converter according to claim 13, wherein the PWM half-bridge circuit works in the discontinuous conduction mode at a light load.

26. The converter according to claim 13, wherein the PWM half-bridge circuit works in the continuous conduction mode at a heavy load.

27. The converter according to claim 13, wherein the PWM half-bridge circuit works in the discontinuous conduction mode at a full-range load.

* * * * *